April 22, 1969    L. B. SCOTT    3,440,096
METHOD OF REMOVING SOLID PROPELLANT
Filed July 16, 1962    Sheet 1 of 3
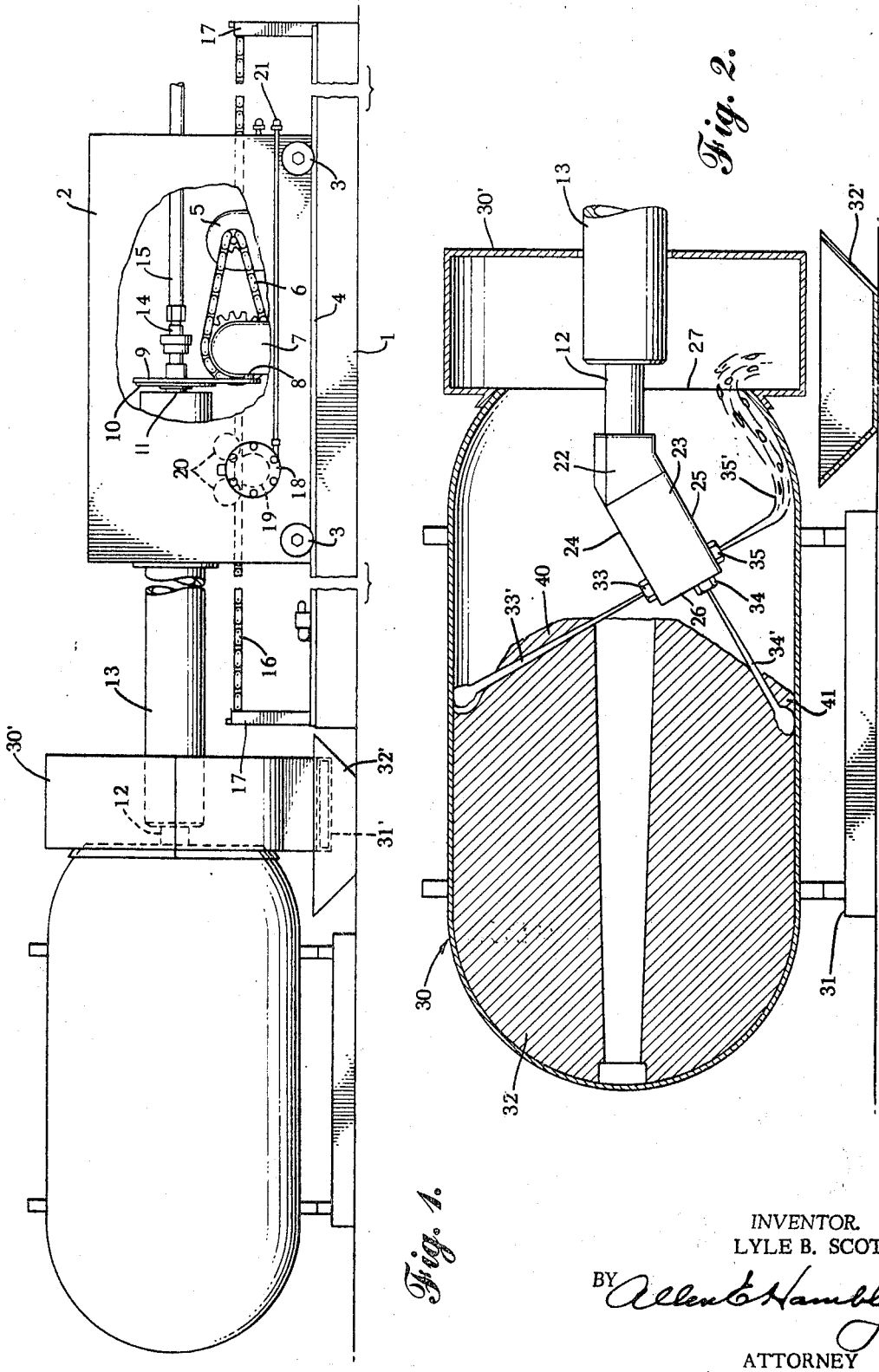
INVENTOR.
LYLE B. SCOTT
BY Allen E. Hambly
ATTORNEY

INVENTOR.
LYLE B. SCOTT
ATTORNEY

United States Patent Office

3,440,096
Patented Apr. 22, 1969

3,440,096
METHOD OF REMOVING SOLID PROPELLANT
Lyle B. Scott, South Gate, Calif., assignor to Byron Jackson Inc., Long Beach, Calif., a corporation of Delaware
Filed July 16, 1962, Ser. No. 209,997
Int. Cl. B08b 9/08, 3/02
U.S. Cl. 134—24                                     3 Claims The present invention relates to a method of removing solid material from a container and more particularly for removing solid monopropellant fuel from the cylinders of rocket engines.

Solid rocket fuels are compounded in liquid form and poured into rocket engine cylinders. There is a relatively high incidence of cases in which imperfections in the mass of propellant require that the rocket engine cylinder not be used. In addition the burning characteristics of the solid propellant fuel vary with age so that it is customary to discard such cylinders after a lapse of time. The solid propellant fuel cylinders are quite expensive and, therefore, it is highly desirable that they be reclaimed by removal of the imperfect or aged solid propellant fuel therefrom so as to enable a new mass of propellant material to be poured therein. Heretofore available methods of removing the propellant from rocket engine cylinders have not been altogether satisfactory due to reasons of safety and imperfect cleaning of the fuel from the engine cylinders.

Accordingly, it is a primary object of the present invention to provide a method for removing solid propellant material from rocket engine cylinders in a safer, more efficient and more economical manner.

In accomplishing the present invention a liquid jet is employed to erode the propellant material and wash the same from the propellant cylinder. Such erosion and washing have the multiple advantage of removal of the propellant without the generation of heat, as is caused by conventional cutting methods, and of soaking the propellant material with water, thereby rendering the operation more safe and more effective, and of rapid cleaning of the cylinder walls.

Another object of the invention is to provide a method of removing propellant material from a rocket engine cylinder by moving longitudinally of the cylinder a revolvable head through which water is pumped, said head having nozzles so directed as to cause jets of water to progressively cut a spiral pathway or to cut frusto-conical swaths through the cylindrical body of propellant materials, and to thereafter cut through the residual propellant materials, and to wash such material from the wall of the cylinder or container therefor.

Another object of the invention is to provide a method of removal of solid propellant material from rocket engine cylinders wherein a jet of water is projected against the body of propellant material at one end of the rocket engine cylinder, such jet issuing laterally of the body of fuel and revolving about said axis while being progressively moved axially of said body of propellant material so as to erode or hydraulically cut a helical swath or to cut a plurality of axially spaced circular or frusto-conical swaths through said body, and following said jet with a second jet disposed at an angle to the first jet so as to cut a swath intersecting the swath cut through the body of fuel by the first mentioned jet thereby progressively severing the previously cut propellant material from the body thereof contained within said cylinder. In accordance with the invention the second jet may be reversely directed to flush spent fluid and waste propellant from the cylinder, or alternatively a third jet may be reversely directed so as to flush the cylinder wall.

Still another object is to provide a method according to the next preceding object wherein the propellant material is removed from the rocket engine cylinder in stages by the passage through the material of a first pair of angularly related jets of fluid and by the subsequent passage through the material of a second pair of angularly related jets of fluid, said second pair of jets including one jet directed at a reverse angle to the axis of the body of propellant material as compared with the first pair and the other of said second pair of jets, whereby to flush spent fluid and waste propellant from the cylinder.

Another object of the invention is to provide in the method referred to above a procedure using a cutter head provided with fluid jet nozzles supported for longitudinal movement into a rocket engine cylinder and means for moving the cutter head longitudinally while such cutter head revolves.

Others objects of the invention will be hereinafter described, or will become apparent to those familiar with the art.

Removing propellant from a rocket engine cylinder which is substantially longitudinally disposed and has an axially aligned access through one end, by advancing axially through the propellant and in a direction away from the access a pair of angularly related revolving fluid jets, progressively eroding a swath through the propellant with one of the pair of fluid jets, progressively eroding a second swath through the propellant, intersecting the first swath, with the other of the pair of fluid jets, and advancing axially through the propellant a third revolving fluid jet following the pair of jets and directed reversely to the direction of advance of the pair of jets to flush spent fluid and waste propellant from the cylinder through the access. Each jet of the pair of jets may be directed forwardly to the direction of advance of the pair of jets; and the jets may be advanced through the propellant simultaneously and intermittently.

In the accompanying drawings:

FIG. 1 is an elevational view of propellant removal apparatus useful in the practice of the method hereof;

FIG. 2 is a fragmentary longitudinal section through a rocket cylinder and illustrating the removal of solid propellant material therefrom by a fluid directing head;

Like reference characters in the several figures of the drawings and in following description designate corresponding parts.

Figure 3:
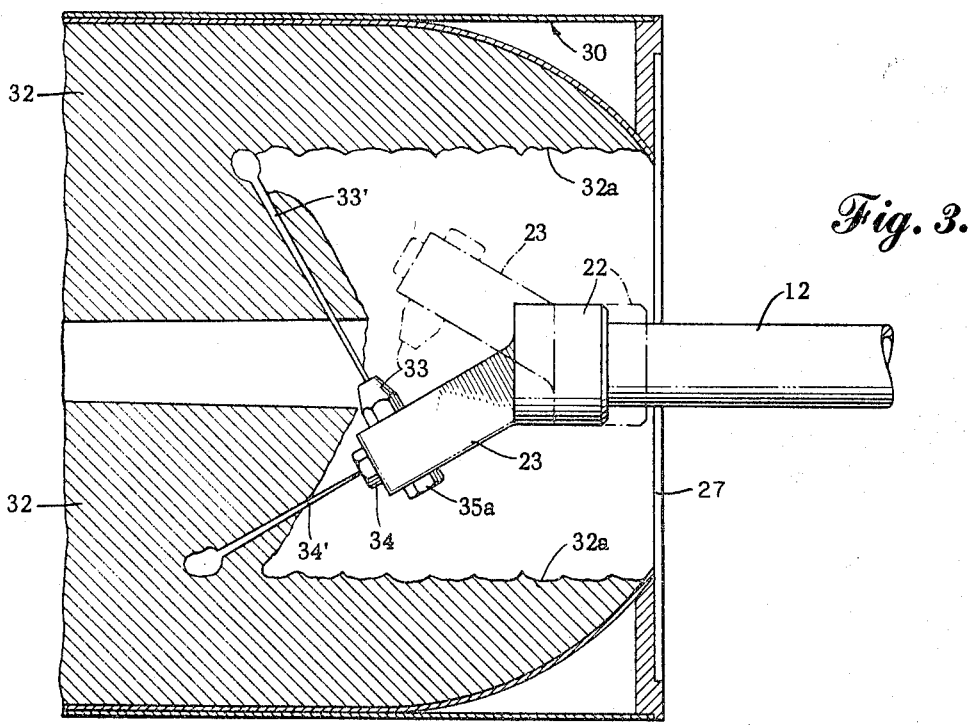
FIG. 3 is a fragmentary longitudinal sectional view illustrating the first stage propellant removal in accordance with the method of the invention.

Referring first to FIGS. 1 and 2 there is generally shown an apparatus useful in the practice of the present invention. This apparatus comprises a base or rectangular skid 1 on which is shiftably mounted for longitudinal movement a carriage 2 having rollers 3 engageable with side rails 4 on the skid. Carried by the carriage 2 is a motor 5, or other source of power connected by a chain drive 6 to a gear box 7. From the gear box projects a shaft 8 for driving a belt 9 which extends about a pulley 10 on a rotary drive 11. Hence, the motor 5 and other mechanism just described constitute rotary drive means. Extending longitudinally from the drive 11 is a hollow spindle 12 surrounded by a tubular shroud 13 and adapted to be rotated by the rotary drive means. In addition there is connected to the rotary drive 11 a swivel coupling 14 connected to a conduit 15 leading from a suitable source of fluid under pressure which may preferably be located at a remote location so as to satisfy safety requirements in view of the nature of the propellant material to be treated in accordance with the invention.

Means are provided for effecting longitudinal movement of the carriage 2 and thus the spindle 12 relative to the skid 1, and in the illustrative embodiment such means are disclosed as comprising a chain 16 extended between uprights 17, 17 at opposite ends of the skid. Cooperative with the chain and carried by the carriage 2 is an air or other suitable drive motor 18 having a drive sprocket 19 engageable with the chain 16 in opposition to a pair of idlers 20. The motor 18 is under the control of a valve or other suitable control mechanism as generally denoted at 21.

Referring now to FIG. 2 it will be noted that there is provided at the outer extremity of the spindle 12 what may be characterized as a head 22 which projects at 23 laterally of the spindle at an angle of approximately 30°, being provided with opposed sides 24 and 25 which are angularly related to the axis of the spindle as just mentioned and an end face 26 normal to the faces 24 and 25 and therefore disposed at an angle of approximately 60° to the axis of the spindle 12.

The cutter head is adapted to be moved longitudinally by the motor 18 into the open end or access 27 of a rocket engine cylinder generally denoted at 30, supported on a cradle 31, and containing body of solid rocket fuel or monopropellant which, as is well known in the art, is a rubbery copolymer and includes a suitable binder and burning catalyst. As seen in FIG. 2 the cutter head 22 is provided with jet orifice fittings 33 and 34 on the faces 24 and 26, respectively, and preferably with an orifice fitting 35 in the face 25 of the head whereby fluid provided from the source referred to above through conduit 15 and spindle 12 to the cutter head produces angularly directed fluid jets from the orifice fittings 33 and 34.

As the carriage 2 is moved axially of the rocket engine cylinder 30 and the head 22 is revolved the jets designated 33' and 34', respectively, similarly advance axially of the rocket engine cylinder and revolve about the axis of the latter whereby there is produced a cutting action attributable to the fact the jet 33' and 34' are disposed at angles relative to the axis of the cylinder such that upon revolution of the jets the jet 34' erodes a swath through the propellant material 32 which intersects a swath previously cut by the jet 33' as will be more particularly described. In addition it will be noted that a jet 35' issuing from nozzle 35 and directed generally oppositely from jets 33' and 34' back washes the cylinder walls and flushes spent cutting fluid and waste propellant material therefrom and out through access 27.

It will be noted that a hood 30' is suitably mounted at the open end 27 of the cylinder 30 and has outlet 31' whereby spent cutting fluid is contained and directed to a collector trough 32'. From the collector trough the fluid together with waste propellant material may be suitably collected, filtered and reutilized as may be desired.

In the practice of the method of the present invention, it will be noted upon reference to FIG. 2 that axial advance of the spindle 12 and cutter head 22 within the rocket engine cylinder 30 will cause the advancement of the fluid jets 33' and 34'; and rotation of the head 22 causes the jets to revolve about the axis of the cylinder, resulting in the cutting or eroding through the propellant material 32 by each of the jets of either a spiral or helical swath if advance of the head is continuous; a series of axially spaced circular swaths if advance of the head is intermittent, the swaths virtually intersecting as the head rotates, and the jet 33' cutting a more steeply inclined swath than the jet 34', so that upon each subsequent revolution, the jet 33' will remove a progressive conical or spiral section of propellant material, as designated at 40, and will also remove a residual section of propellant material 41 from the wall of the cylinder.

Figure 4:
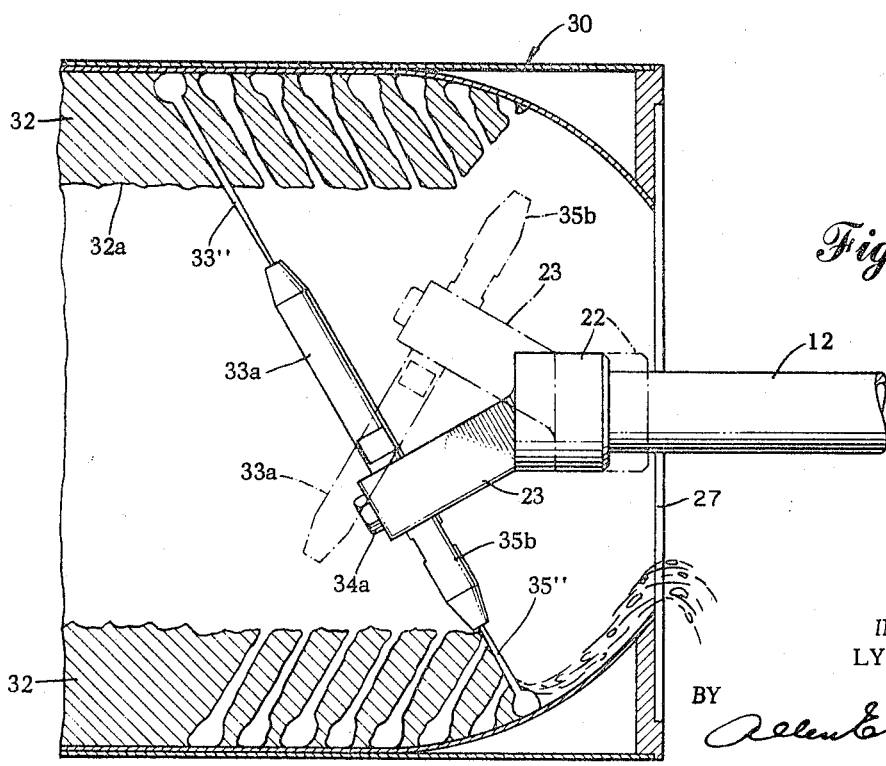
FIG. 4 is a view corresponding to FIG. 3 but illustrating the second stage propellant removal according to the method of the invention.

Referring to FIGS. 3 and 4 there is illustrated a method of first removing from the cylinder 30 a central core of the propellant material 32, as is useful in the event that the rocket cylinder is of such a diameter as to preclude one stage removal of the propellant material. Similar reference characters are employed in FIGS. 3 and 4 as those heretofore employed except that it will be noted that in lieu of a jet orifice fitting 35, there is provided in FIG. 3 a plug 35a so that only fluid jets 33' and 34' issue from the cutter head 22 to progressively form an axial opening 32a by the removal of the aforementioned core of propellant material in the manner described above. In the second sage of the two-stage operation as shown in FIG. 4, there is substituted for orifice fitting 33 an elongated fitting 33a; and there is substituted for the plug 35a an elongated orifice fitting 35b, from which there respectively issues a fluid jet 33" and a fluid jet 35"; while in lieu of orifice fitting 34 in the end of the cutter head, there is now provided a plug 34a.

As seen in FIG. 4, the fluid jet 33", pursuant to axial advance and revolution of the spindle 12, is advanced within the cavity 32a in the propellant material, and cuts a progressive spiral swath or spaced frusto-conical swaths extending to the cylinder wall. Fluid jet 35" on the other hand, being in this view axially aligned with, but directed oppositely relative to the jet 33", intersects the swath cut by jet 33" so as to remove the residual propellant material. Since the jet 35" is reversely directed, spent cutting fluid and waste propellant material are flushed from the open end or access 27 of the cylinder.

Figure 5:
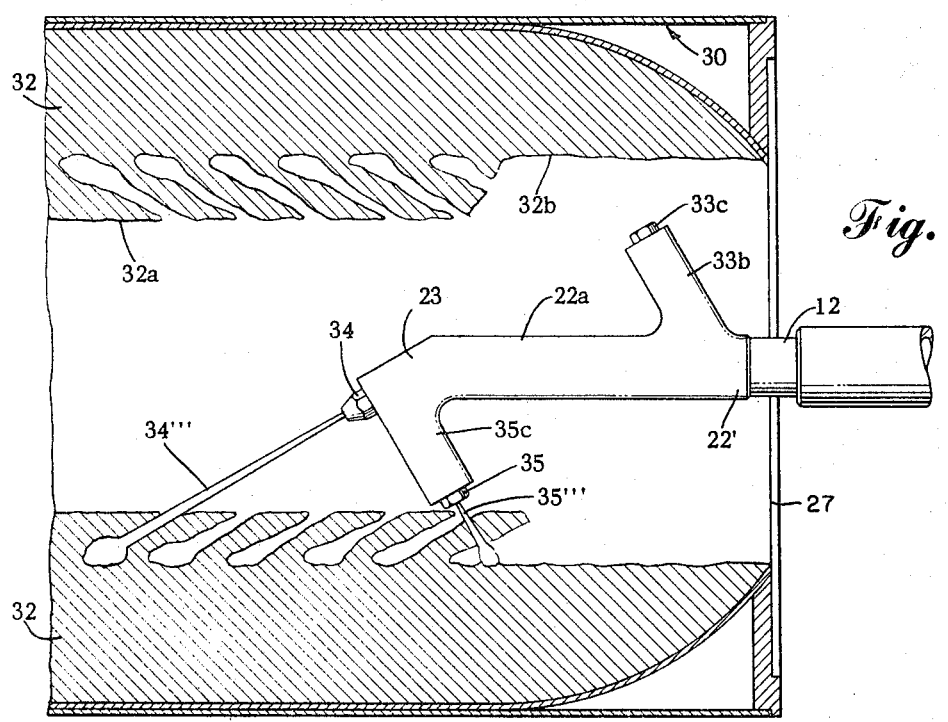
FIG. 5 is a fragmentary longitudinal sectional view showing a modified fluid directing head in a second stage of propellant removal.

Referring now to FIG. 5 it will be noted that a modified cutter head designated 22' is provided with an elongated body section 22a interposed between its connection to the spindel 12 and the angularly disposed end 23 thereof. At the forward extremity of the head 22' is an orifice fitting 34, as previously described, from which issues a fluid jet 34'''. The head 22' is provided with a rearwardly and laterally extended projection 35c carrying the orifice fitting 35, so that there issues from the latter a rearwardly directed fluid jet 35'''. In effect the jets 34''' and 35''' correspond essentially to the jets 34' and 35' described in connection with FIG. 2, but the fluid jets of FIG. 5 are adapted more particularly for the partial further removal of propellant material from the cylinder 30 following the previous removal of a central core so as to leave therein an enlarged bore 32a as shown in FIGS. 3 and 5, whereby a larger bore is provided as shown at 32b in FIG. 5.

Figure 6:
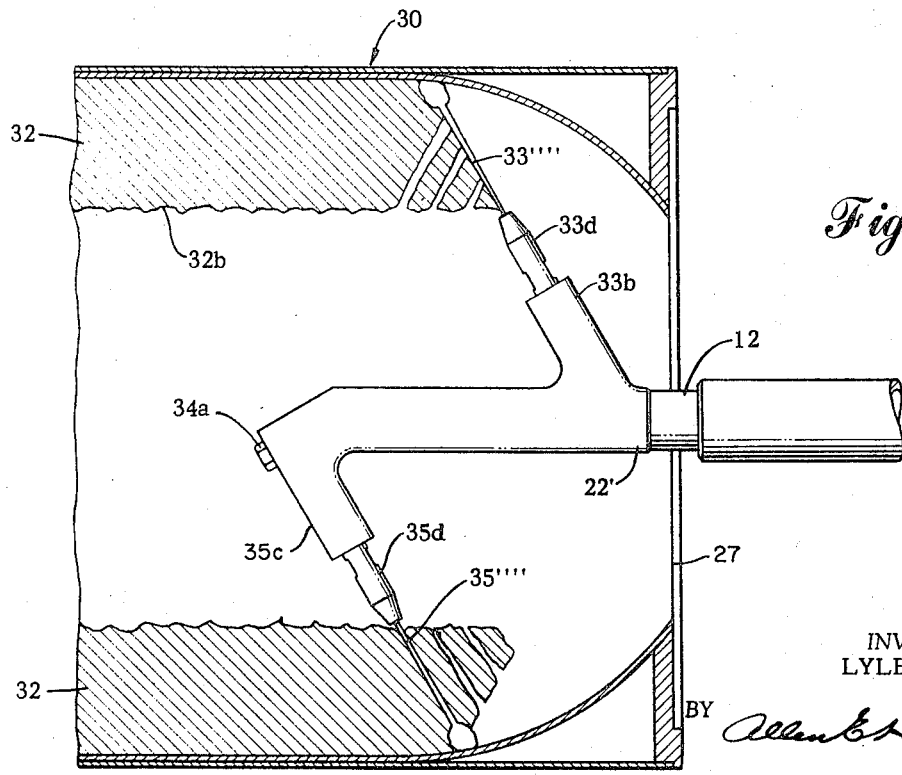
FIG. 6 is a view corresponding to FIG. 5 showing the head thereof modified for final stage propellant removal.

Moreover, the head 22' is adapted, as shown in FIG. 6, to be modified so as to remove the residual propellant material in the cylinder 30 in FIG. 5 by the provision of an extension orifice fitting 35d for the orifice fitting 35, and by the substitution of a plug 34a for the orifice fitting 34 of FIG. 5. In addition it will be noted that the cutter head 22' is provided, at a location spaced substantially rearwardly from the advancing end of the latter, with an angularly disposed outwardly projecting arm 33b which in FIG. 5 is provided with a closure plug 33c, but which in FIG. 6 is provided with an extension orifice fitting 33d. By virtue of this arrangement, it will be noted that fluid jets 33'''' and 35'''' issue from the respective orifice fittings 33d and 35d in axially spaced relation of the head 22', and in substantially parallel planes, so that the swath cut through the body of propellant material by the advancing fluid jet 35'''' is intersected by the swath cut through the propellant material by the succeeding jet 33''''', and so that the propellant material is completely removed from the cylinder 30 and the inner wall of the latter is washed clean.

This fluid jet arrangement, as a last stage in a multiple stage removal of propellant material from the cylinder, enables the removal of propellant from cylinders of large diameters, say on the order of up to 10 feet or larger in diameter, using jets which are directed oppositely towards a common intermediate diametrical plane, adjacent which the cutting occurs.

By way of example, optimum propellant removal conditions have been found to prevail employing orifices, in the heads herein shown and in other heads having various combinations of jets directed so as to cut intersecting swaths having a diameter on the order of 11/64 to 3/16 inch through which water is forced at the rate of about 50 gallons per minute per open orifice. Plain water is preferably employed to erode the propellant material, such water being effective in rendering the solid propellant substantially water saturated due to the fact that the solid propellant has an affinity for and absorbs a large amount of water, and the propellant is thereby rendered safe and easy to handle as the waste propellant is flushed from the cylinder undergoing cleaning. In addition the water may preferably be treated with a quantity of inhibitor, such as sodium chromate, to neutralize the corrosive effects of ammonium perchlorate in the propellant as the latter is washed from the cylinder.

I claim:

1. The method of removing propellant from a substantially horizontally disposed rocket engine cylinder having an axially aligned access through one end comprising advancing axially through said propellant and in a direction away from said access a pair of angularly related revolving fluid jets, progressively eroding a swath through said propellant with one of said pair of fluid jets, progressively eroding a second swath through said propellant intersecting the first swath with the other of said pair of fluid jets, and simultaneously advancing axially through said propellant a third revolving fluid jet following said pair of jets in said direction and directed reversely to the direction of advance of said jets to flush through said access from said cylinder spent fluid and waste propellant.

2. The method of claim 1 wherein each jet of said pair of jets is directed forwardly to the direction of advance of said jets.

3. The method of claim 1 wherein said jets are advanced intermittently through said propellant.

References Cited

UNITED STATES PATENTS

| | | | |
|---|---|---|---|
| 1,176,518 | 3/1916 | Burns | 134—167 |
| 1,492,905 | 5/1924 | Swanick | 134—5 |
| 1,587,194 | 6/1926 | Sladden | 134—167 |
| 1,803,425 | 5/1931 | Cunningham. | |
| 2,217,360 | 10/1940 | Court | 15—104.1 |
| 2,245,554 | 6/1941 | Court. | |
| 2,245,575 | 6/1941 | Court | 134—167 |
| 2,254,848 | 9/1941 | Holveck | 134—168 |
| 2,306,926 | 12/1942 | Allen | 134—24 |
| 2,510,056 | 6/1950 | Axtell et al. | 134—5 |

FOREIGN PATENTS

| | | |
|---|---|---|
| 98 | 1906 | Great Britain. |
| 742,844 | 1/1956 | Great Britain. |

MORRIS O. WOLK, *Primary Examiner.*

J. ZATARGA, *Assistant Examiner.*

U.S. Cl. X.R.

15—104.1; 60—253; 134—10, 34, 167; 202—241; 201—2